J. G. BERGQUIST.
PROCESS OF DISINTEGRATING MOLTEN SLAG.
APPLICATION FILED FEB. 28, 1910.
1,047,370.
Patented Dec. 17, 1912.
2 SHEETS—SHEET 1.
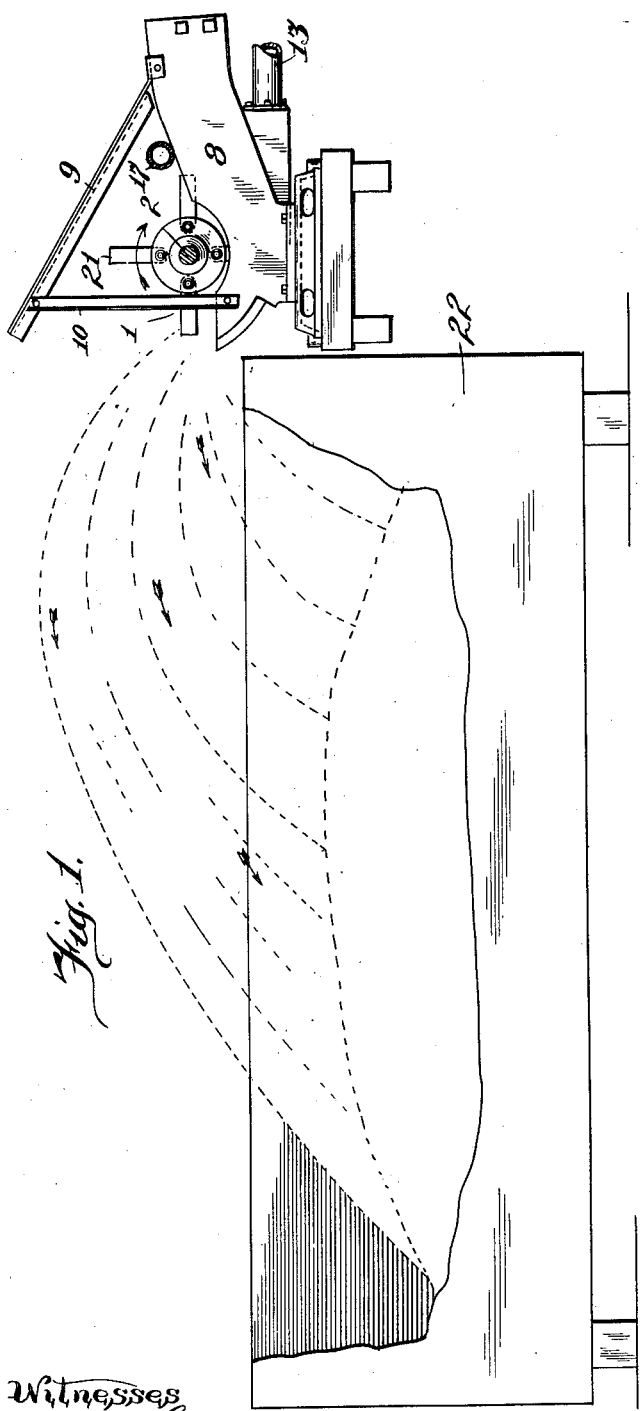
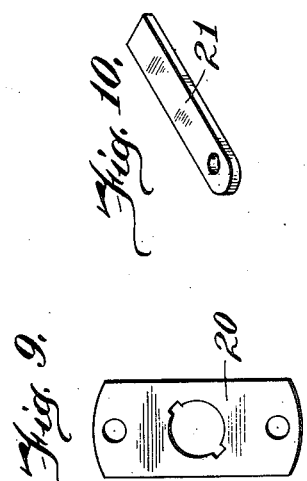
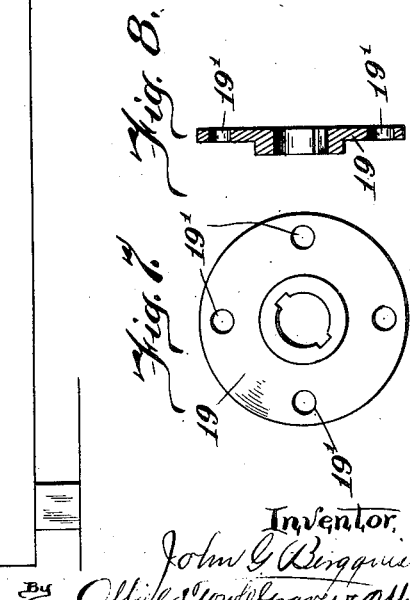

J. G. BERGQUIST.
PROCESS OF DISINTEGRATING MOLTEN SLAG.
APPLICATION FILED FEB. 28, 1910.
1,047,370.
Patented Dec. 17, 1912.
2 SHEETS—SHEET 2.
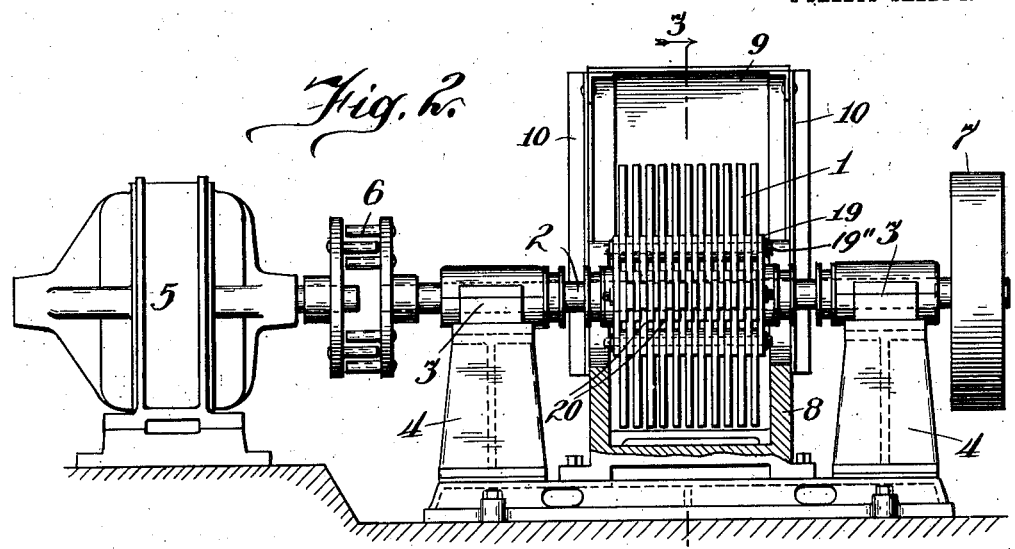
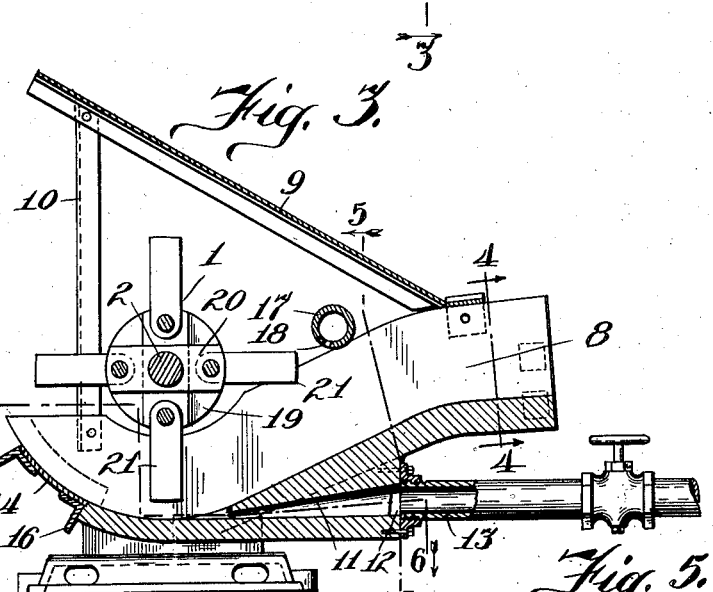
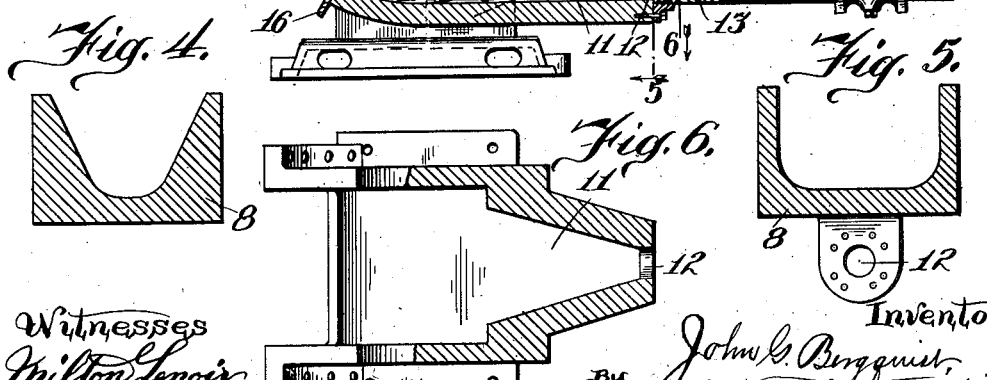

UNITED STATES PATENT OFFICE.

JOHN G. BERGQUIST, OF CHICAGO, ILLINOIS.

PROCESS OF DISINTEGRATING MOLTEN SLAG.

1,047,370.  Specification of Letters Patent.  Patented Dec. 17, 1912.

Application filed February 28, 1910. Serial No. 546,297.

*To all whom it may concern:*

Be it known that I, JOHN G. BERGQUIST, a citizen of the United States, residing at Chicago, in the county of Cook and State of Illinois, have invented a certain new and Improved Process of Disintegrating Molten Slag, of which the following is a specification.

This invention relates to an improved process of disintegrating molten slag, and it has for its salient objects to provide a process by means of which a stream of molten slag can be disintegrated as a continuous process by means of the combined action of the mechanical disintegrator and water, the process being so conducted that the slag is delivered substantially dry notwithstanding the use of the water; to provide a process which may be carried on uninterruptedly for long periods of time, and in an extremely simple and economical manner; to provide a process in which the slag may be loaded onto a car if desired by the same operation which results in disintegrating it; to provide a process which results in forming the slag into a very evenly or uniformly granulated product just right for subsequent use in making cement; to provide a process which may be varied to modify the degree of fineness or coarseness of the disintegration; to provide a process which may be carried out by the use of extremely simple, inexpensive and durable apparatus; to provide a process which requires but little space in which to carry out the same; and in general, to provide an improved process of the character referred to.

The invention consists in the matters hereinafter described, and more particularly pointed out in the appended claims.

In carrying out my process, I cause the stream of molten slag to be delivered to a rotary beater, driven at a high rate of speed, and the beater members of which scrape or shear off successive portions of the stream of slag and project it upwardly into the air, and simultaneously with the separation of the portions of slag from the main stream by the beaters it is subjected to the action of water, so that the combined effect of the water and the beaters is to disintegrate the slag into granular form and project it into the air. During its flight through the air it cools and dries, so that it is deposited in a nearly dry and granulated state.

The process will be more accurately understood by a description thereof as carried out by the aid of one suitable form of apparatus shown in the accompanying drawings.

Referring to the drawings, Figure 1 is a side elevation of a disintegrator, the end of the slag runner which delivers to the disintegrator, and a suitable receptacle into which the comminuted slag is delivered; a side portion of the tank being broken out to show the pile of disintegrated slag; Fig. 2 is an end elevation of the disintegrator shown in Fig. 1; Fig. 3 is a sectional view taken on line 3—3 of Fig. 2; Fig. 4 is a cross sectional view taken on the broken line 4—4 of Fig. 3 and looking in the direction of the arrows; Fig. 5 is a similar view taken on line 5—5 of Fig. 3; Fig. 6 is a horizontal sectional view taken on line 6 of Fig. 3 and looking downwardly; Figs. 7 to 10, inclusive, are details of the disintegrator beater.

Referring to the drawings and describing first the disintegrating machine, 1 designates as a whole a rotary beater which is rigidly mounted upon a drive shaft 2 seated in suitable journal blocks 3, 3, on standards 4, 4. The disintegrator may be driven from an electric motor 5 connected to the drive shaft through a clutch 6, or it may be driven from a belt pulley 7 mounted on the other end of the shaft.

The lower portion of the beater wheel runs in a suitable trough or runner 8, the sides of which rise nearly to the hub of the wheel, as seen clearly in Fig. 1, and the bottom of which is curved to conform approximately to the periphery of the wheel, as best seen in Fig. 3. A guard bar or shield 9 is arranged above the wheel, its lower end being supported across the top of the trough and its front end by upstanding standards 10.

The trough or runner 8 is approximately V-shaped in cross section before it reaches the disintegrator (see Fig. 4), but broadens out and merges into a flat bottom trough as to that portion which underlies the beater blades (see Fig. 5). At a point approximately tangential to the lowermost part of the trough a wide, relatively thin water inlet passage 11 communicates with the trough; this inlet being desirably formed in the casting which forms the curved portion of the trough, and said inlet merging into a round passage at its outer end, as indicated at 12, where it connects with a supply pipe 13. The delivery end of the trough is formed by means of a removable curved plate or extension 14, reinforced by transverse angles 15 and 16; this construction being adopted in order that the delivery end of the trough may be extended or shortened at will by substituting plates 14 of different width, thereby determining the angle of delivery of the disintegrated slag. An additional water supply pipe 17 is arranged to extend across the trough just in rear of the beater wheel; this pipe being provided with a series of perforations 18 to deliver into the trough, and being connected with a suitable source of water under pressure.

The beater wheel, as desirably constructed and as shown herein, comprises a pair of side cheek pieces or disks 19 keyed and apertured, as shown at 19', to be retained upon the main shaft 2, a plurality of plate supporting rods or bars which extend through these cheek pieces parallel with each other and at regular intervals apart, a series of space blocks 20 threaded upon the main shaft and each having its two ends engaged with opposed pairs of the bars 19'' and a series of beater blades 21 threaded upon each of the rods 19''. The space blocks 20 are threaded upon the main shaft alternately at right angles to each other, i. e., cob-house fashion, from which it follows that between the ends of each pair of adjacent space blocks 20 space is left to receive a beater blade 21, and it also follows that the beater blades of one row are in circumferential alinement with the spaces between the beater blades of the next row considered circumferentially of the wheel. The beater blades are loosely pivoted on their supporting rods 19'', but when the wheel is in operation it is run at a high speed of rotation and the beater blades therefore stand out substantially radially and are presented to the slag, edge foremost.

The disintegrating wheel is preferably arranged about on a level with the receptacle 22 onto which the disintegrated slag is delivered.

Describing now the process as carried out with this apparatus, the molten slag from any source of supply, as for example a blast furnace, progresses through the runner or trough 8 in a continuous stream and spreads out into a comparatively thin and broad stream just before it reaches the wheel. The wheel is driven at a high rate of speed, say at a peripheral speed of about 7000 feet per minute, so that the successive beater blades each remove but a small portion of the stream of slag. Meantime water under pressure is forced in through the passage 11 to the bottom of the stream of slag, and as it encounters the molten slag is instantly converted into steam and produces in effect a continuous explosion. The combined action of the steam and water and beaters upon the slag disintegrates it into small fragments, and by the shape of the delivery end of the trough it is projected obliquely forwardly and upwardly with great force, and travels a considerable distance through the air before descending to the pile. While thus suspended in its flight the intense heat of the slag is vaporizing and driving off the moisture, so that in practice, if the supply of water be properly regulated, the disintegrated slag is deposited in a but slightly moist condition, and the heat remaining in the slag serves to still further dry it after being deposited. While I have shown the apparatus as depositing the slag in a receptacle or tank, I frequently arrange the disintegrating apparatus so that it delivers into a gondola or open-topped car.

The auxiliary supply pipe 17 is not ordinarily necessary, but I sometimes admit a certain proportion of water through this pipe as well as through the lower inlet 11.

It will be understood that the process is susceptible of being carried out by a different apparatus from that shown and described herein; it being obvious that any suitable mechanism may be used for coöperating with the water to disintegrate and project the slag into space, so that it hardens sufficiently to become non-coherent before it is deposited. In this connection, it will of course be understood that it is not essential that the supply of water be so restricted that the slag is deposited in a nearly dry condition, because, while this is a decided advantage in several respects, the product is nevertheless perfectly formed if the fragments or granules harden sufficiently so that they do not substantially cohere together when deposited, even though wet.

I claim as my invention:

1. The process of disintegrating molten slag, which consists in spreading the slag into a relatively thin coherent stream, introducing a liquid into said stream, and subjecting the slag to a series of blows delivered in the direction of flow of the slag, whereby the latter is disintegrated and projected through the air until solidified to non-coherent particles, substantially as described.

2. The process of disintegrating molten slag, which consists in spreading the slag into a relatively thin coherent stream, introducing water into the bottom of said stream, and subjecting the slag to a series of blows delivered in the direction of flow of the slag, whereby the latter is disintegrated and projected through the air until solidified to non-coherent particles, substantially as described.

3. The process of disintegrating molten slag, which consists in spreading the slag into a relatively thin coherent stream, introducing water into the bottom of said stream, and subjecting the slag to a series of blows delivered by a body moving upwardly and in the direction of flow of said slag, whereby the latter is disintegrated and projected outwardly and upwardly through the air until solidified to non-coherent particles, substantially as described.

4. A process of comminuting substances, consisting in moving a body in a bath of the substance in a molten condition so as to eject particles of the substances and in solidifying particles of the substance.

5. A process of comminuting metals, consisting in rotating a body in a bath of the molten metal so as to eject particles of the metal and in solidifying the particles of the metal.

6. The process of comminuting substances, consisting in introducing water to a bath of the substance in a molten condition and simultaneously moving a body in the bath so as to project particles of the substance through the air and solidify the same, substantially as described.

7. The process of comminuting substances, consisting in introducing water beneath a bath of the molten substance and simultaneously rotating a body in the bath so as to eject particles of the substance from the bath into the air to solidify said particles, substantially as described.

JOHN G. BERGQUIST.

Witnesses:
ALBERT H. GRAVES,
EMILIE ROSE.